United States Patent Office 3,795,661
Patented Mar. 5, 1974

3,795,661
HALOGEN CATALYZED DIRECT ESTERIFICATION PROCESS FOR POLY(ETHYLENE TEREPHTHALATE)
Brian Armstead Dementi, Richmond, Joseph Donald De Caprio, Hopewell, and Stanley David Lazarus, Petersburg, Va., assignors to Allied Chemical Corporation, New York, N.Y.
No Drawing. Filed Mar. 1, 1972, Ser. No. 230,960
Int. Cl. C08g 17/013
U.S. Cl. 260—75 R                                                9 Claims

ABSTRACT OF THE DISCLOSURE

The manufacture of linear high-molecular weight, film and fiber forming polyester wherein the reaction of polycarboxylic acid with a polyol takes place in the presence of an element, or a compound which produces said element in said reaction from Group VII–B, of Periodic Chart of the Atoms by Henry D. Hubbard, Welch Scientific Co. (1959) to improve processing and end product characteristics.

BACKGROUND OF THE INVENTION

Field of the invention

This invention relates to a process for preparing linear high-molecular weight polyethylene terephthalate polyesters. More particularly, it relates to an improved polyester product and process for directly preparing said polyesters in the presence of an element or a compound which produces said element in said reaction from Group VII–B of Periodic Chart of the Atoms by Henry D. Hubbard, Welch Scientific Co. (1959) which can then be polycondensed into high molecular weight and high quality linear polyesters suitable for further processing into shaped articles, such as, fibers and films useful in preparing textile and industrial articles of commerce.

Description of the prior art

It is conventional to prepare linear high-molecular weight polyesters on a commercial scale either by the ester interchange reaction between dimethyl terephthalate and a polyol or by a direct esterification process first disclosed by Whinfield and Dickson in 1941 and illustrated in U.S. Pat. 2,465,310. This initial direct esterification process was not entirely satisfactory as lengthy refluxing of the acid and glycol was necessary to obtain a solution. Many improvements have been made upon the Whinfield and Dickson process, some of which are illustrated in U.S. Pats. 3,050,533; 3,427,287; and 3,484,410. And although many improvements have been made in the direct esterification route for preparing linear high-molecular weight polyesters to the extent that some commercial use is now made of this process, many problems still exist in the processing of the polyester, as well as obtaining the necessary physical properties of the finished polyester for certain end uses. Another improvement is disclosed by Taylor in U.S. Pat. 3,446,766, granted May 27, 1969. This patent discloses a process for preparing improved polyester fibers having very low concentrations of free-carboxyl-group contents by adding a copper salt of an organic carboxylic acid and a molar excess of alkali metal iodide to a fully polymerized, molten polyester prior to melt spinning. Such polyester having low free-carboxyl-group contents gives superior performance when used in articles where heat-degradation is a problem. Another known necessary improvement to yield superior performance when used in commercial articles where heat-degradation is a problem includes suppressing undesirable side reactions such as ether linkages as such linkages affect a reduction of the polymeric polyester's softening point, light resistance, heat resistance, oxidation resistance, and, when the polymer is shaped into yarn and dyed, its dye light fastness. In short, excess ether groups in the final polymeric polyester make such unsatisfactory for use in textile end uses, such as, filaments and fibers as well as in films. Other problems are observed in the direct esterification reaction as when the reaction is carried out too slowly, thus allowing these side linkages to increase. Therefore, it is indeed helpful to catalyze the reaction to control the processing time in order to control the product quality; however, when the same elements utilized as a catalyst serve multiple purposes of improving the end product then a full contribution is made.

Summary of the invention

The present invention provides an efficient and convenient method for more readily preparing polyester shaped structures which are useful in many textile and industrial applications in a greatly shortened period of time having highly improved end product characteristics. Furthermore, the invention provides polyester fibers which have excellent resistance when embodied in articles where heat-degradation is a problem. Further, an important advantage is the usefulness of one additive that not only yields improved characteristics to the finished polymeric polyester but also acts as a catalyst during the direct esterification reaction wherein the improved product is prepared.

A prime object of this invention is to provide new and useful linear, high-molecular weight polyesters having valuable properties, including that of being capable of being formed into useful items of commerce, such as, filaments, fibers and films.

Another object of this invention is a catalytic process for the esterification of aromatic dicarboxylic acid with a polyol under direct esterification conditions.

A further object of this invention is to provide an additive for the direct esterification reaction of an aromatic dicarboxylic acid with a polyol which improves the end product characteristics of the polyester.

A still further object of this invention is to provide an additive mixture of elements or compounds that will produce said elements from Group VII–B of Periodic Chart of the Atoms by Henry D. Hubbard, Welch Scientific Co. (1959) for the direct esterification reaction of an aromatic dicarboxylic acid with a polyol which acts both as a catalyst in said reaction and yields improved end product characteristics to the polymeric polyethylene terephthalate polyester. Other objects will become apparent in the course of the following detail description.

In accordance with the above objects, it has now been discovered that rapid reaction rates in the preparation of polyester by the direct esterification route can be obtained while at the same time improving the end product characteristics of the polyester. Accordingly, the present invention is the preparation of a linear high-molecular weight, film and fiber polyester by reacting an aromatic dicarboxylic acid with a polyol containing 2 to about 10 carbon atoms per molecule under direct esterification conditions in the presence of an element, a mixture of said element or a compound which produces said element from Group VII–B of Periodic Chart of the Atoms by Henry D. Hubbard, Welch Scientific Co. (1959) in an amount sufficient to catalyze said reaction and to improve the end product characteristics of said polyester.

The direct esterification of the aromatic dicarboxylic acid and the polyol can start at a temperature as low as 200° C. and range up to 300° C. and at atmospheric and superatmospheric pressures ranging up to 500 p.s.i.g. The direct esterification is carried out in the absence of oxygen-containing gas. More preferably, the reaction temperature ranges from about 230° C. to about 280° C. and at a pressure, when superatmospheric pressure is employed, ranging from about 50 to about 250 p.s.i.g. The actual reaction times will vary depending upon the reaction temperature and pressure. The amount of polyol is reacted with the aromatic dicarboxylic acid in an amount ranging from about 1 to about 3 moles of polyol per mole of acid. The amount of the element additive present during the direct esterification reaction ranges generally from about 0.005 to about 0.100 weight percent based on the weight of the glycol. And, it can be a mixture of the elements enunciated in the teaching examples. The additive can be added prior to or during the direct esterification reaction.

Various other additives may be added before, during, or after direct esterification reaction in order to further control or tailor the reactions in order to obtain required characteristics of the final polymer for specific end uses. As, for example, if fatigue resistance is desirable, a small amount of diphenylene phenylene diamine can be added. Additives can also be added to control such characteristics of the finished polymer as heat and light stability, dye uptake, adhesion, static dissipation, luster, flammability, dyestuff precursors and assistants, low free carboxyl content, brighteners, fluorescent agents, ether formation suppressants and the like.

The condensation or polymerization of the material obtained by the direct esterification between aromatic dicarboxylic acid with a polyol is usually carried out at a reduced pressure which can be as low as 0.1 torr and a temperature in the range of from about 260° C. to about 300° C. This part of the reaction is carried out under these conditions for periods of about 1.0 to about 10 hours and preferably from about 2 to about 6 hours until a polymerized polyester product of the required molecular weight as determined by viscosity or other convenient physical measurement is obtained. The duration of such periods depends upon many factors, such as the polymerization conditions set up for the process, such as, pressure and temperature profiles, surface generation conditions, ingredient mole ratios, catalyst concentration, additives utilized, requisite viscosity, etc. Any excess glycol and other by-products are removed more easily by utilizing continuous agitation of the mass while simultaneously exposing said mass to a predetermined vacuum.

The catalyst and end product characteristic improver that can be utilized in carrying out the objectives of this invention is an element, a mixture of said elements or a compound which produces said element in said reaction from Group VII–B of Periodic Chart of the Atoms by Henry D. Hubbard, Welch Scientific Co. (1959). Elemental iodine or a mixture that includes iodine is preferred. The iodine element alone is most preferred. Surprisingly, it has now been found that an element, a mixture of said elements, or a compound which produces said element in said reaction from Group VII–B of Periodic Chart of the Atoms by Henry D. Hubbard, Welch Scientific Co. (1959) yields a catalytic effect to the direct esterification process wherein an aromatic dicarboxylic acid is reacted with a polyol as well as making an improved end product characteristic effect to a fiber and film polyester made by such process.

Many tests are utilized for the evaluation of thermal or heat stability of cords for reinforcing rubber articles. One such test, commonly referred to as the heat stability test, measures the percentage strength retention of tire cord which has been subjected to an elevated temperature in a hermetically sealed glass tube and essentially consists of taking a 2.0 gram sample of the cord to be tested and subjecting said cord to moisture equilibrium at 55% relative humidity and 75° F. then sealing it into an approximately 29 cm.$^3$ glass tube and heating to a temperature of 300° F. for forty-eight hours, after which the residual tensile strength of the cord is determined and its percentage strength retention calculated relative to an untreated control sample of the same material and the same weight. Each sample is tested five times and a statistical average of the percentage strength retention of the tire cord base upon the initial strength of the cord as 100%.

The following examples are illustrative of various embodiments of the present invention but are not construed as limiting the invention in any way. The parts of ingredients are expressed as stated in the examples.

EXAMPLE I

Five hundred milliliters of ethylene glycol were placed in a 1000 milliliter flask equipped with a thermometer, magnetic stirrer, and heating mantle. The ethylene glycol was heated to 191° C., then 6.8 grams of terephthalic acid were added with stirring. Upon complete dissolution of the terephthalic acid, the first of a series of four (4) ten (10) milliliter samples was taken for carboxyl analysis. The temperature remained constant during the sampling.

| Sample number | Timer (hrs.) | Milliliters of KOH (0.1041 N) used to reach end point |
| --- | --- | --- |
| 1 | 3.998 | 5.30 |
| 2 | 4.498 | 4.90 |
| 3 | 4.999 | 4.45 |
| 4 | 5.499 | 4.10 |

To follow the rate of esterification, the carboxyl versus time (hour) data was plotted, and the rate constant was determined from the slope. The rate constant was found to be 0.254 hour$^{-1}$.

EXAMPLE II

Five hundred milliliters of ethylene glycol were placed in a 1000 milliliter flask equipped with a thermometer, magnetic stirrer, and heating mantle. The ethylene glycol was heated to 191° C. and 0.501 gram, 0.087% based on weight of glycol of iodine was added. The iodine dissolved rapidly. Then 6.8025 grams of terephthalic acid was added with stirring. Upon complete dissolution of the terephthalic acid, the first of five (5) ten (10) milliliter samples was taken for carboxyl analysis. Sample No. 1 was taken at zero (0) reading on the timer. The temperature was maintained constant during the sampling.

| Sample number | Timer (hrs.) | Milliliters of KOH (0.0933 N) used to reach end point |
| --- | --- | --- |
| 1 | 0 | 14.02 |
| 2 | 0.320 | 5.69 |
| 3 | 0.789 | 1.58 |
| 4 | 1.802 | 0.44 |
| 5 | 2.901 | 0.35 |

To follow the rate of esterification, the carboxyl end groups versus time (in hours) data were plotted and the rate constant was found to be 3.025 hour$^{-1}$.

EXAMPLES III–X

The procedure as described in Example II was used with the additives, concentration, and rate constant as shown below.

| Additive | Concentration | Rate constant hours$^{-1}$ |
| --- | --- | --- |
| Iodine | 0.0073 | 1.054 |
| Do | 0.044 | 2.352 |
| Bromine | 0.044 | 3.550 |
| Do | 0.0069 | 2.893 |
| Ca(OCl)$_2$ | 0.440 | 0.452 |
| LiOCl | 0.460 | 0.451 |
| NaOI | 0.450 | 0.452 |
| KOBr | 0.450 | 0.453 |
| Control | None | 0.254 |

EXAMPLE XI 1800 grams terephthalic acid, 1354 grams ethylene glycol, 1.5 grams antimony tristallate, 5.4 grams diisopropyl amine, and 1.3 grams iodine are charged to an electrically heated one gallon autoclave equipped with a double spiral agitator, condenser and bottom discharge port. The reactor is sealed, purged with nitrogen and pressured to 60 p.s.i.g. with nitrogen. The agitator is started and adjusted to 12 r.p.m. The temperature controller is set at 270° C. internal temperature. Any excess pressure build up after 75 p.s.i.g. is bled off through the condenser. Two hours after start of the batch, the internal temperature is at 210° C. and distillate starts to leave the condenser. In the next 15 minutes, 77 cc. of condensate is collected. A total of 915 cc. of condensate is collected in 90 minutes. At this point the pressure is released over a 30 minute period and the internal temperature adjusted to 280° C. A vacuum pump is then attached to the reactor and the polymerization is continued for 150 minutes under reduced pressure (0.1 torr). At the end of the polymerization cycle nitrogen is admitted into the reactor and the polymer is extruded through the bottom port into a water quench trough from where the coagulated strand is fed through a pelletizing machine (Wiley mill). The polyester is then dried for 17 hours at 135° C. and 0.5 torr in a vacuum oven. Analysis of the polymer show intrinsic viscosity 0.89, and carboxyl groups 23.3 equivalents per $10^6$ grams. This polymer is spun through a 1-inch extruder, drawn and combined to make 1300 denier, 192 filament yarn.

EXAMPLE XII

A control polymer is made by the same procedure as in Example XI except no iodine is charged. Distillate starts to collect after 2½ hours at which time the temperature of the batch is 220° C. After another 15 minutes 62 cc. of distillate are collected (compared to 77 cc. for Example XI) and a total of 907 cc. is collected in 2 hours (compared to 915 cc. in 90 minutes for Example XI). The polymer is dried and analyzed and found to have intrinsic viscosity of 0.86 and carboxyl end group content of 29.1 equivalents per $10^6$ grams. This polymer is also spun and drawn into 1300 denier, 192 filament yarn.

The yarn samples of Examples XI and XII are tested for thermal stability by means of the sealed tube test.

The yarn made from the polymer containing iodine retains 86.3 percent of its original strength after exposure to heat while the control yarn retains only 79.5% of its original strength.

We claim:
1. A process for the direct esterification of terephthalic acid with an alkylene glycol which comprises esterifying terephthalic acid with an alkylene glycol containing 2 to about 10 carbon atoms per molecule under direct esterification conditions wherein the glycol and acid are reacted in the presence of an element selected from the group consisting of iodine and bromine; said element being present in amount from about 0.005 to about 0.100 weight percent based on the weight of glycol.
2. The process of claim 1 wherein the direct esterification is conducted at temperatures ranging from about 200° C. to about 300° C. and pressures ranging from atmospheric up to about 300 p.s.i.g.
3. The process of claim 1 wherein the reaction is carried out in the presence of iodine.
4. The process of claim 1 wherein the reaction is carried out in the presence of bromine.
5. The process of claim 1 wherein the reaction is carried out in the presence of bromine and iodine.
6. The process of claim 1 wherein the alkylene glycol is ethylene glycol.
7. The process of claim 1 wherein the molar ratio of said acid to said glycol is 1.0:1.0–2.0.
8. The process of claim 1 wherein the molar ratio of said acid to said glycol is 1.0:1.1–1.6.
9. Stable polyethylene terephthalate polyester in the form of filaments and fibers made from a polyethylene terephthalate polymer prepared from terephthalic acid and ethylene glycol in which the intrinsic viscosity of the polymer is at least 0.75 deciliter per gram and which has incorporated therein a stabilizing amount of bromine, said element being present in an amount from about 0.005 to about 0.100 weight percent based on the weight of glycol.

References Cited
UNITED STATES PATENTS

| | | | |
|---|---|---|---|
| 2,891,928 | 6/1959 | Dickey et al. | 260—75 |
| 3,446,766 | 5/1969 | Taylor | 260—22 |

FOREIGN PATENTS

| | | |
|---|---|---|
| 1,113,087 | 8/1961 | Germany. |

MELVIN GOLDSTEIN, Primary Examiner

U.S. Cl. X.R.

260—45.7 R, 75 H